July 24, 1956     A. LIPPMAN, JR     2,755,521

GLASS SEAL CONSTRUCTION AND METHOD

Original Filed Dec. 27, 1952

INVENTOR.
ALFRED LIPPMAN JR.
BY Toulmin & Toulmin
ATTORNEYS

United States Patent Office 2,755,521
Patented July 24, 1956

2,755,521

GLASS SEAL CONSTRUCTION AND METHOD

Alfred Lippman, Jr., Dayton, Ohio, assignor to The Commonwealth Engineering Company of Ohio, Dayton, Ohio, a corporation of Ohio Original application December 27, 1952, Serial No. 328,207. Divided and this application November 23, 1953, Serial No. 393,827

6 Claims. (Cl. 20—56.5)

This invention relates to seals and more particularly to seal structures for glass and to methods of producing the same.

This application is a division of Alfred Lippman, Jr., application, Serial No. 328,207, filed December 27, 1952, and assigned to The Commonwealth Engineering Company of Ohio.

The air-tight sealing of glass bodies is a problem in many industries. For example in the production of multi-pane windows for use in refrigerators, showcases, buildings, and the like, it is necessary to provide between the panes of glass a dead air space and this air space must be sufficiently sealed off from the atmosphere to insure that no moisture will enter the unit, as even the moisture of atmospheric air affects the glass detrimentally over a period of time.

It has been customary in the production of such multi-pane windows to secure a pair of spaced glass plates by a metal frame in which an organic sealing compound is incorporated for inhibiting the passage of moisture from the atmosphere to the dead air space. In such structures it is necessary to incorporate a silica gel or some other moisture absorbent to insure of long life of the assembly.

It has been proposed also to produce an all-glass multi-pane construction by heating a pair of spaced flat plates to a temperature sufficient to render the glass electrically conductive (generally 950–1000° F.) and to then fuse hot semi-circular sections to the ends of the glass panes to form the air space.

Although the operations already set forth may be successfully performed, a problem arises that the air trapped within the window cools to create a vacuum which causes the large glass plates to buckle inwardly. To offset this, it is necessary to drill a small hole in one of the glass plates and to permit the ingress of dry air during the cooling in order to maintain atmospheric pressure within the unit. This hole, it may also be noted, is utilized for the blowing of air into the unit in order to round out the glass section while it is hot, and accordingly in such constructions the hole is considered a necessity.

It may be noted that it has been found preferable to drill a hole in the form of a cone having a 3/16 inch diameter at the outside portion and a 1/8 inch diameter on the inside portion.

It is a principal object of this invention to provide a commercial process for the sealing of the above described hole or port, the sealing being effected in such a manner that entry of foreign material to the inside of the glass object is inhibited.

It is an important object of this invention to describe a seal structure which is air and moisture impermeable.

It is another object of this invention to describe a novel double acting wedge member.

It is also an object of this invention to describe a novel double acting wedge member which forms a part of the seal of the invention.

These and other allied objectives of the invention will become apparent from the following detailed description and the accompanying drawing wherein.

Figure 1:
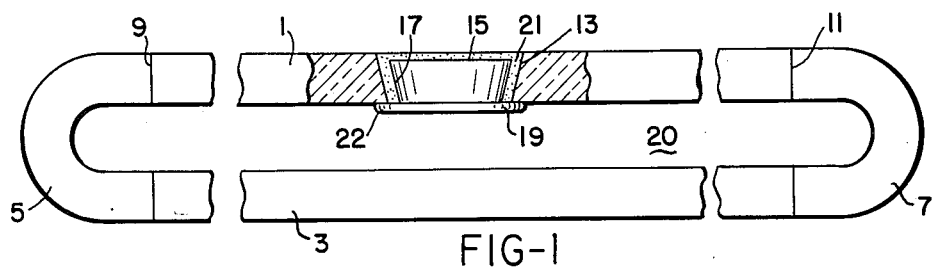
Figure 1 is an elevational view partly in section of an all glass multi-pane window.

Referring to the drawings there is shown in Figure 1 a pair of spaced glass plates 1, 3 to which a pair of U-shaped end members 5, 7 are secured as at 9 and 11, respectively. There is shown in the plate member 1 a conical wall 13 defining a port in which there is positioned a double acting wedge member 15 which may be of polyethylene for example.

The double acting wedge member 15 has an upper conical portion having walls 17 which as shown in Figure 1 are parallel with the walls 13. The lower portion of the wedge member 15 is a disc shaped body portion 19 which in Figure 1 engages the lower peripheral portion 22 of wall 13. This disc shaped portion 19 extends into the spacing 20 which is filled with dry air at substantially atmospheric pressure.

A body of a sealing material 21 fills the hollow wedge member 15 and overflows the sides thereof to completely close the spacing between the walls 17 and 13 to form a continuous sealing structure for the port.

Figure 2:
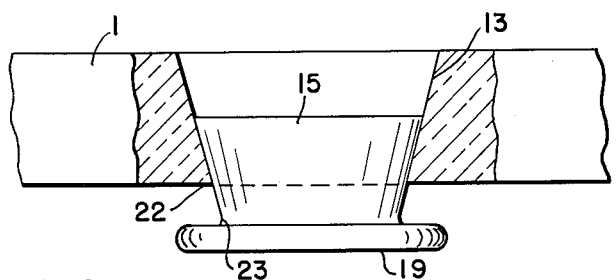
Figure 2 is a view illustrating an initial step in the process of invention.
Figure 3:
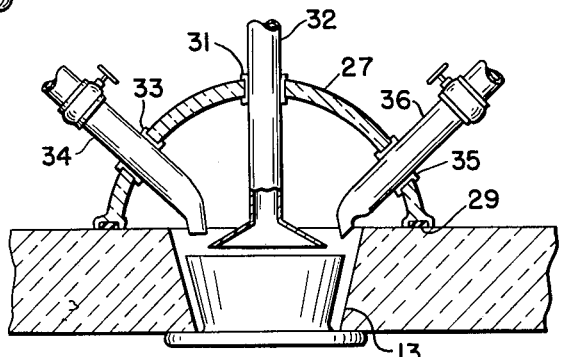
Figure 3 is a view illustrating the formation of the seal of invention.
Figure 4:
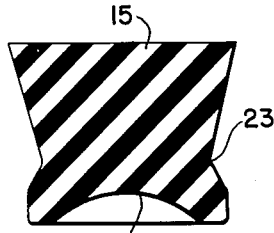
Figure 4 is a view of a wedge member distorted into position to be placed into the seal of invention.
Figure 5:
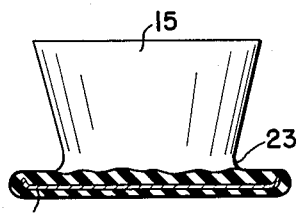
Figure 5 is a view of a further embodiment of the wedge member of invention.

The method of forming the seal of invention is illustrated in Figures 2, 3 and 4 and the method is applied to a multi-pane window as follows:

Initially the window sections are formed as shown in Figure 1, the port is drilled and as a result of the drilling will normally have a relatively rough wall 13 although the same is not necessary to the practice of invention.

As noted hereinbefore, the hole is utilized while the assembly is in a hot condition to round out the end members 5, 7; thereafter, the assembly is allowed to cool to room temperature in an atmosphere of dry air and only dry air is permitted to enter the spacing 20. Thereafter the double acting wedge member having the lower portion 19 resiliently secured to the upper portion 17 as at 23 is distorted to substantially the shape shown in Figure 4.

In the distorted position the wedge member is then placed within the port, the lower portion 19 being generally forced through the lower peripheral portion 22 of the port. When the wedge member has entered the port the lower resilient portion 19 returns to its normal shape as indicated in Figure 2 and the lower portion will be spaced slightly from the bottom wall of plate 1 while the wall 17 engages the wall 13 to temporarily seal the port.

With the assembly in this condition the structure shown in Figure 3 is then moved over the port, thus the housing 27 mounted on the resilient members 29, which may be for example of silicone rubber, secure the housing in air tight relation with the plate member 1.

Housing member 27 is provided with openings 31, 33 and 35, opening 31 having a conduit 32 extending centrally into the chamber, which conduit extends slightly into the wedge member where such is of a hollow configuration. A conduit 34 which passes through the opening 33 terminates closely adjacent the wedge member, while the conduit 36 which passes through the opening 35 terminates closely adjacent the wall 13.

In the practice of the method of invention vacuum is applied to the conduit 32 and air is immediately withdrawn from the interior of the housing and the light-weight wedge member 15 moves quickly to a permanent sealing position to completely close the port as is indicated in Figure 3. Thereafter, and while evacuating the air, or after the air has been completely evacuated, sealing compounds are introduced through conduits 34, 36, respectively, until the port and the wedge member, where the same is hollow, are completely filled with the sealing compound. The sealing compound is allowed to cool and an air tight seal is thus formed in the plate 1 and the dry air is retained in chamber 20. The sealing compound may suitably be an organic sealing compound such as referred to hereinbefore in connection with the prior art.

This application is related to copending applications of Alfred Lippman, Jr., Serial No. 328,208, filed December 27, 1952, Patent Number 2,720,009, issued October 11, 1955, and Serial No. 329,423, filed January 2, 1953, assigned to the same assignee as the present invention.

It will be understood that this invention is susceptible to modification in order to adapt it to different usages and conditions and accordingly, it is desired to comprehend such modifications within this invention as may fall within the scope of the appended claims.

I claim:

1. A method of sealing a port of a glass object which has a pair of glass sheets in sealed relation providing an air spacing therebetween and which method comprises the steps of pressurably and resiliently distorting an insert, introducing the insert into said port in the distorted shape, releasing the pressure to cause said insert to return to normal shape and temporarily close said port, reducing the pressure on the outer side of said insert to cause said insert to move to a permanent blocking position and to engage the inner surface of one of the sheets around the port, and thereafter securing said insert in said position with a sealing material.

2. A sealing structure for a port of an object having an interior air spacing comprising a wall defining the port, a member in the port having an upper portion of wedge-shape spaced from the wall of the port and a lower portion of disc-shape in the air spacing engaging a lower surface of the object about the port closing the port, and a sealing material in the port over said wedge portion, said member being of a resilient, distortable material.

3. A sealing structure for a port of an object having an interior air spacing comprising a wall defining the port, a resilient, distortable member in the port having an upper portion of wedge-shape spaced from the wall of the port and a lower portion of disc-shape in the air spacing engaging a lower surface of the object about the port closing the port, and a sealing material in the port over said wedge-shaped portion and extending downwardly into contact with said disc-shaped portion.

4. A sealing structure for a port of an object having an interior air spacing comprising a wall defining the port, a resilient, distortable member in the port having an upper portion of wedge shape spaced from the wall of the port, said wedge shape portion being hollow, the member having a lower portion of disc-shape in the air spacing engaging a lower surface of the object about the port closing the port, and a sealing material in the port over said hollow wedge-shaped portion and filling the same.

5. A method of sealing a port of a glass object which has a pair of glass sheets in sealed relation providing an interior air spacing therebetween, and which method comprises the steps of: (a) sealing the port of the object with an insert which is engageable with one of the glass sheets about the port to close the port and to prevent communication between the interior air spacing and the port; (b) evacuating the port while the interior air spacing is sealed from the port by a portion of the insert in engagement around the port and in the air spacing; and (c) thereafter closing the evacuated port with a sealing material applied to the port over the insert to prevent communication between the interior air spacing and the port and to prevent movement of said insert portion from the port into the air spacing.

6. A method of sealing a port of a glass object which has a pair of glass sheets in sealed relation providing an interior air spacing therebetween, which method comprises the steps of: (a) sealing the port of the object with a resilient deformable insert which is engageable with one of the glass sheets about the port to close the port and to prevent communication between the interior air spacing and the port; (b) applying a vacuum to the closed port from the outer side of the object while the air spacing is sealed from the port by a portion of the insert in the air spacing to evacuate the port and to draw the said insert portion into tight sealing engagement with the glass sheet about the port; and (c) sealing the said portion to the sheet about the port by applying over the insert sealing material in sufficient amount to completely fill the port.

References Cited in the file of this patent

UNITED STATES PATENTS

| 1,127,013 | Kahn | Feb. 2, 1915 |
| 2,621,397 | Black | Dec. 16, 1952 |
| 2,625,717 | Wampler | Jan. 20, 1953 |
| 2,683,906 | Nevins | July 20, 1954 |
| 2,686,342 | D'Eustachio | Aug. 17, 1954 |